United States Patent
Corcos et al.

(10) Patent No.: US 9,052,234 B2
(45) Date of Patent: Jun. 9, 2015

(54) DIPOLE ANTENNA WITH REFLECTORS HAVING LOW THERMAL MASS FOR DETECTION OF TERAHERTZ RADIATION

(71) Applicant: International Business Machines Corporation, Armonk, NY (US)

(72) Inventors: Dan Corcos, Nesher (IL); Danny Elad, Moshav Liman (IL); Noam Kaminski, Kiryat Tivon (IL); Bernhard Klein, Zurich (SZ); Lukas Kull, Zurich (SZ); Thomas Morf, Gross (SZ)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/663,502

(22) Filed: Oct. 30, 2012

(65) Prior Publication Data

US 2014/0117241 A1    May 1, 2014

(51) Int. Cl.
  *G01J 5/08*    (2006.01)
  *G01J 5/20*    (2006.01)
  *H01Q 19/10*   (2006.01)
  *H01Q 19/30*   (2006.01)

(52) U.S. Cl.
  CPC .............. *G01J 5/0809* (2013.01); *G01J 5/0837* (2013.01); *G01J 5/20* (2013.01); *H01Q 19/108* (2013.01); *H01Q 19/30* (2013.01)

(58) Field of Classification Search
  CPC ........................................................ G01J 5/08
  USPC ................ 250/353, 338.1, 338.4, 340, 341.1
  See application file for complete search history.

(56) References Cited

U.S. PATENT DOCUMENTS

| 2006/0231761 | A1 | 10/2006 | Peytavit et al. |
| 2007/0278407 | A1 | 12/2007 | Wood et al. |
| 2008/0251870 | A1 | 10/2008 | Morf et al. |
| 2011/0315880 | A1 | 12/2011 | Nemirovsky |
| 2012/0091342 | A1 | 4/2012 | Berger et al. |

FOREIGN PATENT DOCUMENTS

WO    2011151756    12/2011

OTHER PUBLICATIONS

Vitiello, M.S. et al., "Room Temperature Terahertz Detectors based on Semiconductor Nanowire Field Effect Transistors", Proc. SPIE 8268, Quantum Sensing and Nanophotonic Devices IX, 826829, Jan. 20, 2012.
Ouyang, Zhengbiao et al., "A Combined Cavity for High Sensitivity THz Signal Detection", Proceedings of SPIE—The International Society for Optical Engineering, vol. 6840, Nov. 12-14, 2007.
Constantine A. Balanis, "Antenna Theory: Analysis and Design", 2nd Ed, publisher: Wiley India Pvt. Ltd., 2007.

*Primary Examiner* — David Porta
*Assistant Examiner* — Faye Boosalis

(57) ABSTRACT

A novel and useful THz radiation detector comprising a suspended dipole antenna and a plurality of reflectors for achieving low thermal mass and high electrical performance. The reflectors used in the antenna do not physical contact the dipole element and are used to shape the radiation pattern in similar fashion as obtained by well-known Yagi-Uda reflectors. The dipole element is connected directly to a load resister for generating heat which is sensed by a sensing transistor. The lack of a mechanical connection to the dipole antenna element prevents any increase in the thermal capacitance of the antenna.

24 Claims, 6 Drawing Sheets

DIPOLE ANTENNA WITH REFLECTORS HAVING LOW THERMAL MASS FOR DETECTION OF TERAHERTZ RADIATION

FIELD OF THE INVENTION

The present invention relates to the field of semiconductor imaging devices, and more particularly relates to a dipole antenna incorporating reflectors and having low thermal mass for detection of Terahertz (THz) radiation.

BACKGROUND OF THE INVENTION

THz radiation imaging is currently an exponentially developing research area with inherent applications such as THz security imaging which can reveal weapons hidden behind clothing from distances of ten meters or more; or medical THz imaging which can reveal, for example, skin cancer tumors hidden behind the skin and perform fully safe dental imaging. Constructing prior art THz detectors is typically a challenging endeavor since both radiation sources and radiation detectors are complex, difficult and expensive to make.

THz radiation is non-ionizing and is therefore fully safe to humans unlike X-ray radiation. THz imaging for security applications, for example, uses passive imaging technology, namely the capabilities of remote THz imaging without using any THz radiation source thus relying solely on the very low power natural THz radiation which is normally emitted from any room temperature body according to well-known black body radiation physics. Passive THz imaging requires extremely sensitive sensors for remote imaging of this very low power radiation. Prior art passive THz imaging utilizes a hybrid technology of superconductor single detectors cooled to a temperature of about 4 degrees Kelvin which leads to extremely complex (e.g., only the tuning of the temperature takes more than 12 hours before any imaging can take place) and expensive (e.g., $100,000 or more) systems. A detector is desirable that can be used to detect THz radiation and that has much lower potential cost compared with existing superconducting solutions. Passive THz imaging, however, requires three orders of magnitude higher sensitivity compared with passive infrared (IR) imaging, which is a challenging gap.

SUMMARY OF THE INVENTION

There is provided a novel and useful THz radiation detector comprising a suspended dipole antenna and a plurality of reflectors for achieving low thermal mass and high electrical performance. The reflectors used in the antenna do not physically contact the dipole element and are used to shape the radiation pattern in a similar fashion as obtained by well-known Yagi-Uda reflectors. The dipole element is connected directly to a load resister for generating heat which is sensed by a sensing transistor/diode. The lack of a mechanical connection of the reflectors to the dipole antenna element prevents any increase in the thermal capacitance of the antenna. The detector concentrates THz energy on a pixel suspended micro-electromechanical systems (MEMS) based platform.

There is thus provided in accordance with the invention, an antenna for receiving terahertz (THz) radiation comprising a suspended conductive dipole element supported by a non-conductive holding arm and a plurality of reflectors physically isolated from the dipole element.

There is also provided in accordance with the invention, an antenna for receiving terahertz (THz) radiation comprising a pair of perpendicularly folded suspended conductive dipole elements supported by a non-conductive holding arm and a plurality of reflectors physically isolated from the dipole elements.

There is further provided in accordance with the invention, a detector for detecting terahertz (THz) radiation comprising a suspended conductive dipole element supported by a non-conductive holding arm, a plurality of reflectors physically isolated from the dipole element, a load impedance directly coupled to the dipole element and operative to convert the received THz radiation to thermal energy and a thermal sensor operative to generate an electrical signal in accordance with the heat generated by the load impedance.

There is also provided in accordance with the invention, a detector for detecting terahertz (THz) radiation comprising a pair of perpendicularly folded suspended conductive dipole elements supported by a non-conductive holding arm, a plurality of reflectors physically isolated from the dipole elements, a single load impedance directly coupled to the dipole elements and operative to convert the received THz radiation to thermal energy and a thermal sensor operative to generate an electrical signal in accordance with the heat generated by the load impedance.

BRIEF DESCRIPTION OF THE DRAWINGS

The invention is herein described, by way of example only, with reference to the accompanying drawings, wherein.

DETAILED DESCRIPTION OF THE INVENTION

The invention provides a dipole antenna incorporating reflectors and having low thermal mass for detection of Terahertz (THz) radiation. The dipole antenna pertains to the field of Terahertz (THz) wave imaging which is the visualization by detection of THz radiation being irradiated or reflected from objects in the imager's field of view. Apart from being a non-ionizing radiation, the wavelengths of the THz portion of the electromagnetic (EM) spectrum are able to penetrate through numerous things such as fog, clothing, packages, etc., enabling imaging with high resolution even by means of relatively small radiating aperture which is crucial in space constrained environments. These qualities make imaging in this part of the electromagnetic spectrum a prime candidate for use in security, surveillance, navigation, etc. systems.

Figure 1:
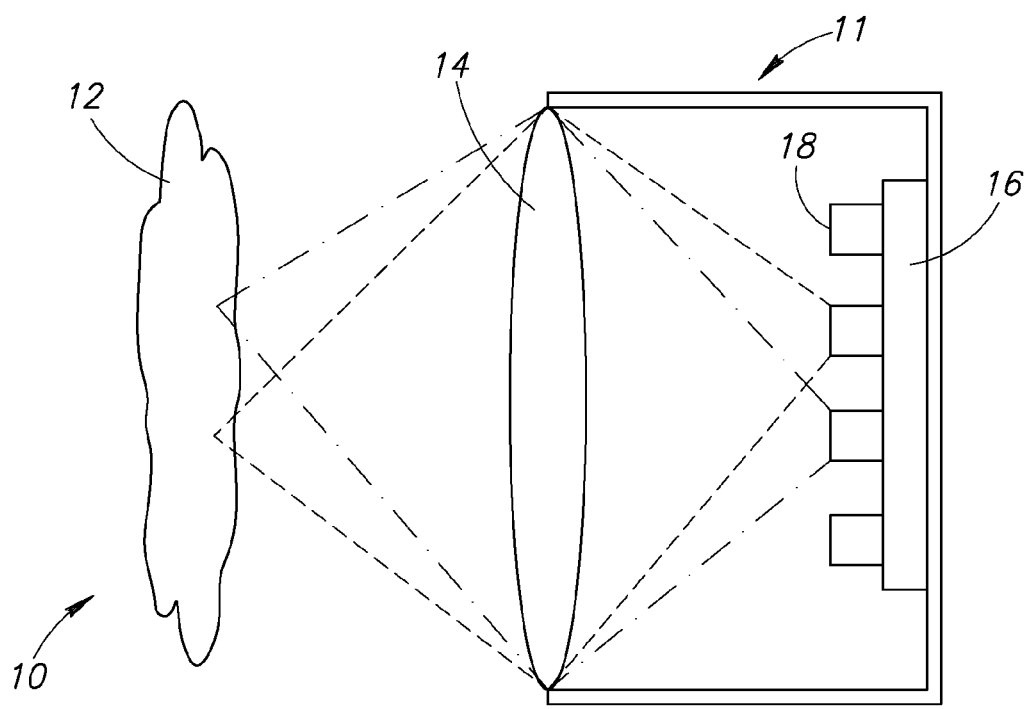
FIG. 1 is a diagram illustrating the structure of an example bolometer for detecting THz radiation.

A diagram illustrating the structure of an example bolometer for detecting THz radiation is shown in FIG. 1. The bolometer, generally referenced 10, comprises the body under test (BUT) 12, lens 14, housing 11, pixel array 18 and read out circuitry 16.

The detection of the THz radiation is performed by an antenna with a resistive load, directed at a specific pixel on the body under test (BUT). The antenna converts the THz electromagnetic energy into electrical current that heats the resistive load. The temperature change of this resistor is then measured as an indication of the temperature of the body under test (BUT).

The dipole antenna of the present invention enables a bolometer to achieve high sensitivity. In order to achieve high sensitivity, an efficient antenna design is provided which functions to collect the incident electromagnetic energy while at the same time has a very small thermal mass and heat capacitance in order to maximize the resistive element warmup.

The invention provides a method for designing a microelectromechanical system (MEMS) based dipole antenna with minimal thermal capacitance that, with the aid of reflectors, forms a directive antenna. In additional, a method for broadening the dipole antenna bandwidth is also provided.

Sensors at THz frequencies are typically Bolometers, since electronics cannot reach these frequencies. Bolometers can be implemented using slightly modified CMOS techniques or using a CMOS SOI process with MEMS post processing. A THz sensor can be directly integrated with readout circuitry in a CMOS-SOI process. One sensor that can be used is an antenna coupled bolometer.

In one embodiment, a broadband antenna with a large thermal capacitance is connected to a load impedance (i.e. termination resistor or port) by a capacitive coupling through a vacuum gap. This physical separation provides thermal isolation to the resistor, which heats up considerably due to the low thermal capacitance. The THz sensor is realized with a temperature dependent resistor or with a FET where it's strongly temperature dependent subthreshold current is used as a sensor.

A bolometer based detector may take the form of a lens on the top of the structure to collect the incident electromagnetic energy of individual pixels. Each pixel is adapted to be thermally isolated from other pixels and from the entire structure. This is achieved by creating a vacuum around the bolometers. In order to increase the sensitivity of the bolometer, the noise is reduced by cooling the entire structure and the antenna down to cryogenic temperatures.

In one embodiment, a basic pixel can take the form of a spiral shaped antenna which performs well and has a wide bandwidth. The antenna is directly connected to a bolometer, which in this example embodiment, is a resistive gate Field-Effect-Transistor (FET). The temperature change of the transistor is sampled through the change in the transistor's current. The antenna and bolometer are separated from the rest of the structure using MEMS techniques to obtain the thermal isolation.

The spiral antenna solution, however, has relatively high thermal capacitance. The high thermal capacitance means that it takes a very long time in order to yield a significant temperature change in the sensor. Without the benefit of a MEMS process for separating the sensor from the bulk, the heat change due to the radiation is greatly reduced and the signal-to-noise ratio is unacceptably low.

In another embodiment, the pixel is implemented using MEMS technology where the metal antenna is replaced with a high resistance antenna. In this embodiment, the antenna does not have a resistive port and the heating is due to the currents in the antenna itself. The MEMS process separates the antenna from the rest of the structure and thus reduces its thermal capacitance and thermal conductivity to the heat sink such that its temperature change is larger. From an electrical point of view, the best way to absorb power is to use a high effective area antenna coupled to a perfectly matched port. The use of an antenna shaped resistive material, however, results in performance far from optimal.

In another embodiment, a suspended antenna and bolometer are constructed over a semiconductor substrate. This embodiment allows for thermal isolation of the bolometer without having to isolate it from the antenna by means of electrical capacitance. The antenna may comprise the well-known dipole antenna or double dipole antenna which has low thermal mass but exhibits poor electrical performance due to its narrow bandwidth.

The detector embodiments described supra suffer from both electrical and a thermal drawbacks. For example, considering an electrical capacitive coupling between the antenna and the resistor, a large enough capacitor must be used which is hard to achieve within a small area, thus limiting the electrical capacitive coupling efficiency. In addition, the requirement of a small vacuum gap significantly increases the complexity of the MEMS process.

To overcome these problems, the present invention provides a detector wherein the antenna is directly connected to the termination resistor (i.e. load impedance) while the combined thermal capacitance of the antenna remains low. A large thermal capacitance, combined with low thermal conductivity, inevitably results in long thermal time constants and hence in low frame rates for thermal sensors.

Figure 2:
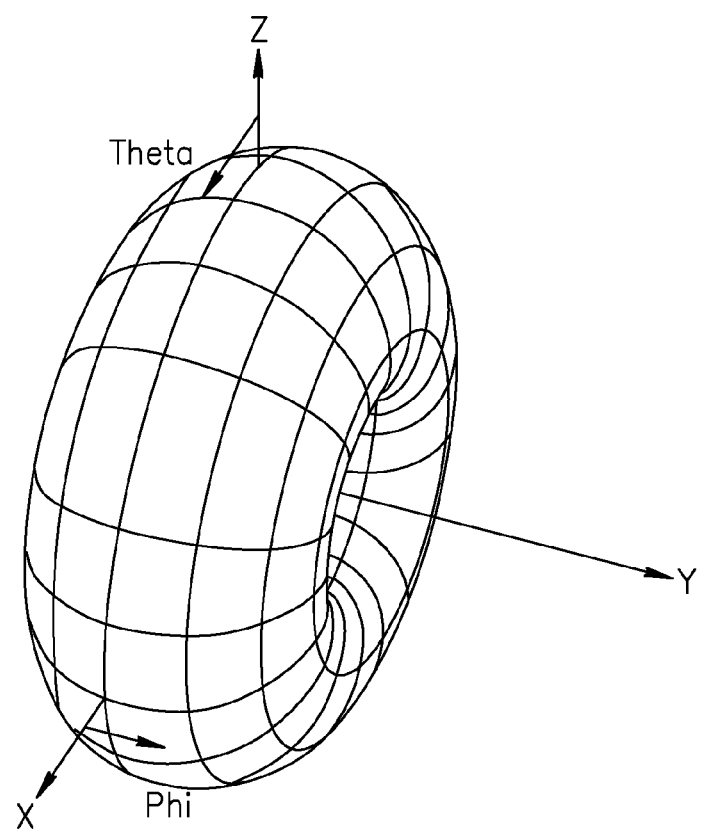
FIG. 2 is a diagram illustrating an example radiation pattern of a dipole antenna polarized in the Y direction.

The antenna of the present invention provides a structure that exhibits both low thermal capacitance and high electrical performance while provides superior performance. The antenna is suitable for implementation in numerous detectors, as well as in any application that requires a low thermal mass. The antenna structure is small in terms of heat capacitance, but at the same time it has high volume from an electrical perspective. In one embodiment, the antenna comprises a standard dipole with two arms having minimal metal widths. Such an antenna, however, has relatively poor electrical performance as it radiates in all directions perpendicular to the dipole's direction as shown in FIG. 2, thus, offering low gain in the desired Z direction. In addition, when placed in an array it causes high cross-talk interference.

In order to direct the Terahertz radiation in the Z direction without increasing the antenna thermal capacitance, a plurality of reflectors is used that do not physically touch the antenna itself. In one example embodiment, three reflectors are used. The first reflector is a conducting plane located substantially $\lambda/4$ below the dipole, where $\lambda$ is the wavelength. This reflector prevents energy radiation in the negative Z direction. The second and the third reflectors are located in the same plane as the dipole (i.e. in the Z=0 plane). These two reflectors are spaced apart parallel to the dipole and function in the same manner as well-known Yagi-Uda reflectors. Yagi-Uda antennas are directional along the axis perpendicular to the dipole in the plane of the elements, from the reflector toward the driven element and the one or more directors. By placing the two reflectors on the two sides of the dipole and at equal distances, they prevent energy radiation in the +X and the −X direction. These three reflectors (i.e. a conducting plane and two Yagi-Uda reflectors) direct the electromagnetic radiation in the +Z direction and since they do not have mechanical connection to the dipole itself, they do not increase the thermal capacitance of the antenna.

Figure 3:
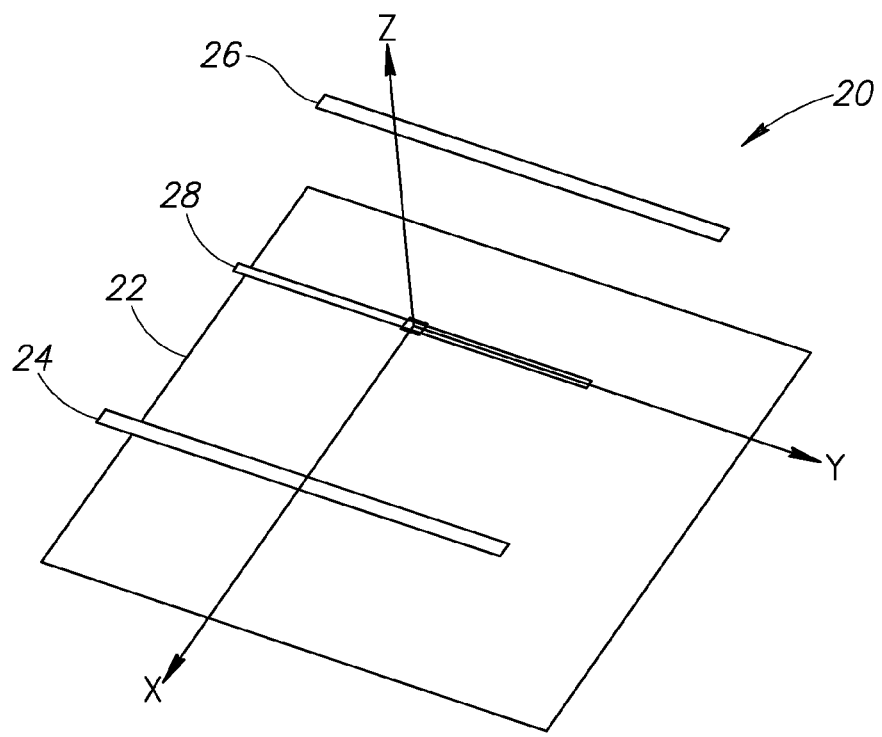
FIG. 3 is a diagram illustrating an example embodiment dipole antenna incorporating multiple reflectors.
Figure 4:
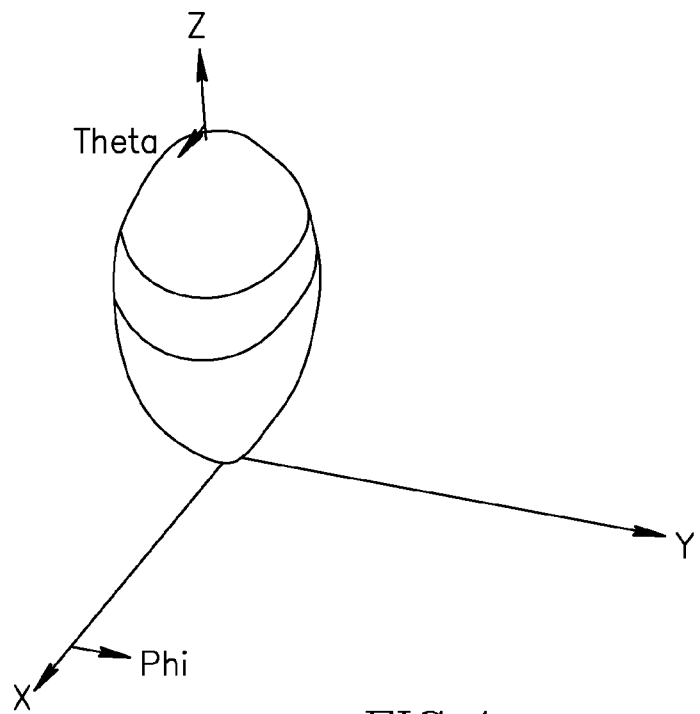
FIG. 4 is a diagram illustrating an example radiation pattern for the dipole antenna with multiple reflectors shown in FIG. 3.

A diagram illustrating an example embodiment dipole antenna incorporating multiple reflectors is shown in FIG. 3. The antenna, generally referenced 20, comprises a dipole element 28, an infinite conductive plane reflector 22 located λ/4 below the dipole and two Yagi-Uda reflectors 24, 26. A diagram illustrating an example radiation pattern for the dipole antenna with multiple reflectors of FIG. 3 is shown in FIG. 4. Note that the radiation pattern now includes energy mostly in the +Z direction.

The dipole with the three reflectors can be implemented using a plurality of methods. In one example implementation, MEMS processes are used in which the dipole (antenna and resistor) is isolated from the rest of the silicon chip by etching and supported by a holding arm having low thermal conductivity. In this manner, the dipole is thermally isolated. In one embodiment, the two Yagi-Uda reflectors are constructed of metal in the silicon chip main frame and do not contact the dipole antenna.

As is well known according to Yagi-Uda theory, the reflectors length (0.5λ) should be slightly longer than the dipole length (0.47λ) so that its current phase lags that of the dipole current phase. The reflector should be set 0.25λ away from the dipole and usually a single reflector is used as more than one reflector does not improve the antenna performance significantly. Combining these two criteria results in an antenna which occupies an area of 0.5λ×0.5λ. The width of the reflectors can be obtained using any suitable well known technique such as CAD simulations.

The dipole antenna (as well as the Yagi-Uda antenna) has linear polarization. The antenna illustrated in FIG. 3 can only radiate and receive Y-polarized electromagnetic fields and cannot absorb X-polarized electromagnetic fields. Since the Planck's radiation to be gathered is randomly polarized, a single linear polarization means that 50% of the energy cannot be absorbed. For this reason, in an alternative embodiment, a second dipole is added that is polarized in the perpendicular direction (i.e. the X direction). In one embodiment, two load resistors are used, one for each perpendicular dipole. This, however, requires additional space than just one resistor and thus increases the thermal capacitance of the detector. To minimize the additional thermal capacitance, in another embodiment, two perpendicular folded dipoles (the folded dipole has a wider bandwidth than a single dipole) are used that are connected to a single resistor.

Figure 5:
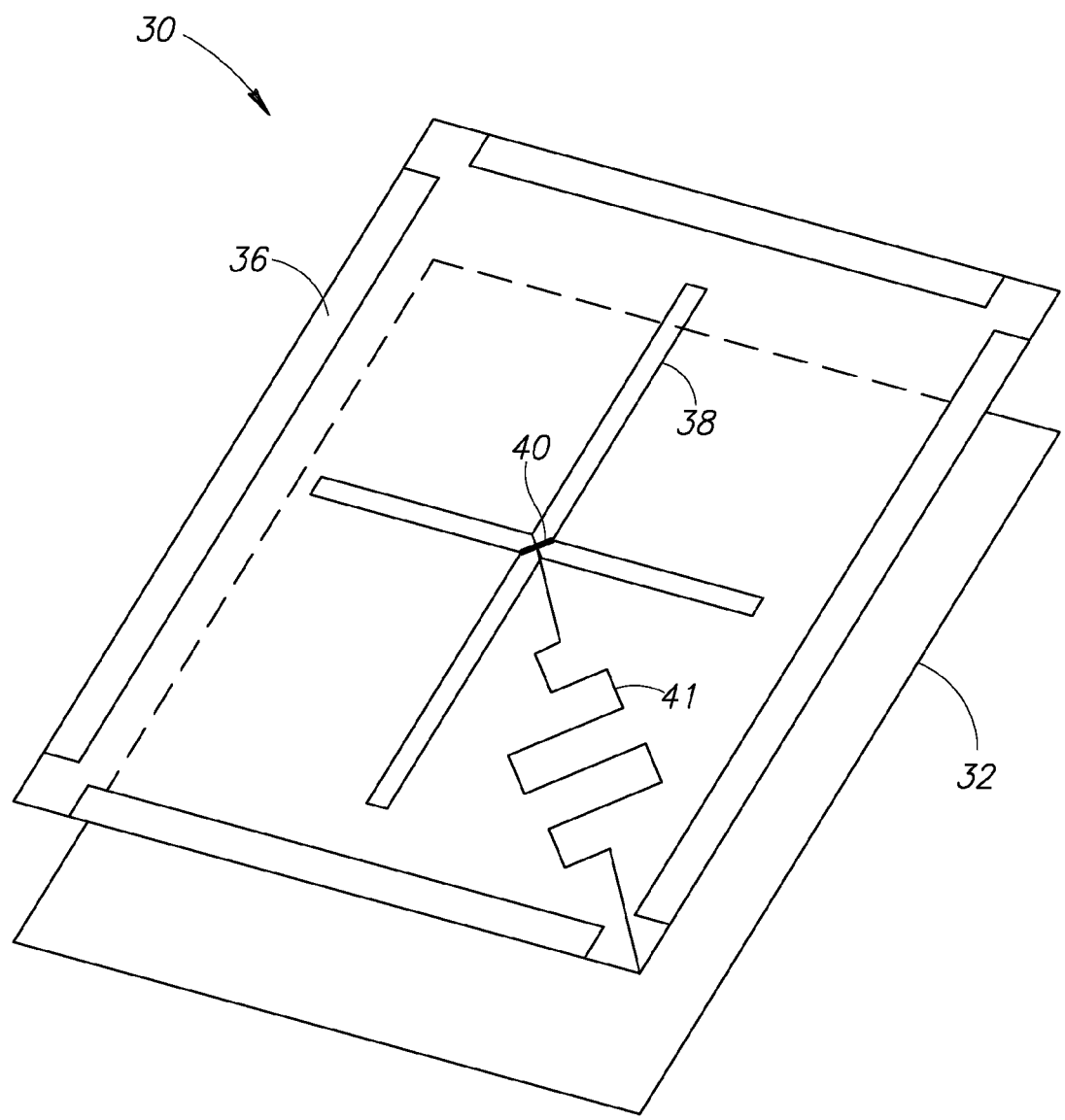
FIG. 5 is a diagram illustrating an example embodiment of a pair of folded dipoles connected to a single load impedance.

A diagram illustrating an example embodiment of a pair of folded dipoles connected to a single load impedance is shown in FIG. 5. The antenna, generally referenced 30, comprises a pair of folded dipoles 38 connected to a single load impedance 40 and suspended by holding arm 41, a conductive plane 32, two pairs of Yagi-Uda reflectors 36 and readout circuit lines 34.

Figure 6:
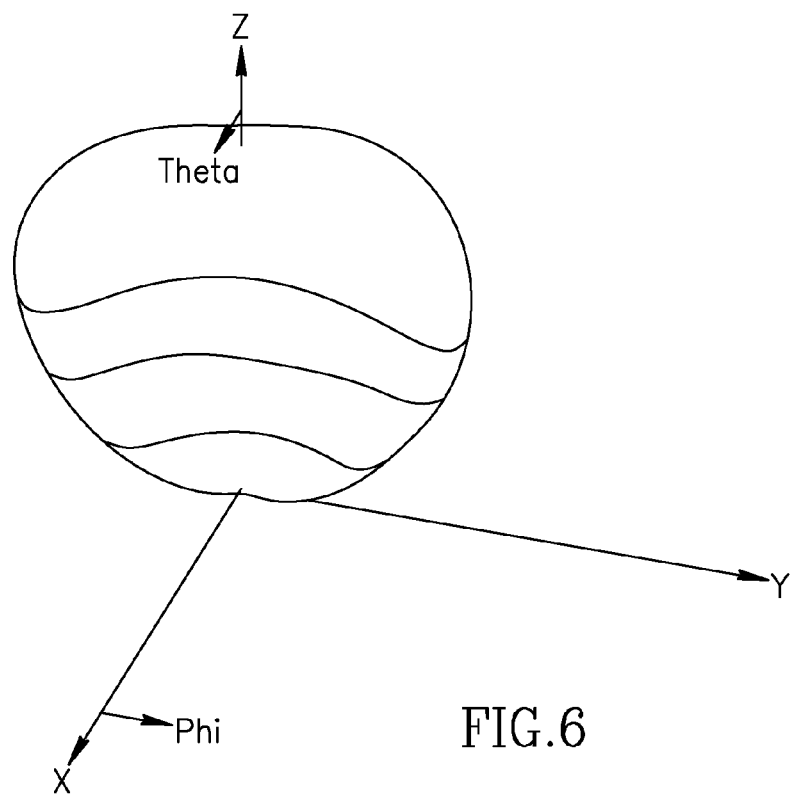
FIG. 6 is a diagram illustrating an example radiation pattern of the dual polarized dipole with reflectors in the X direction.
Figure 7:
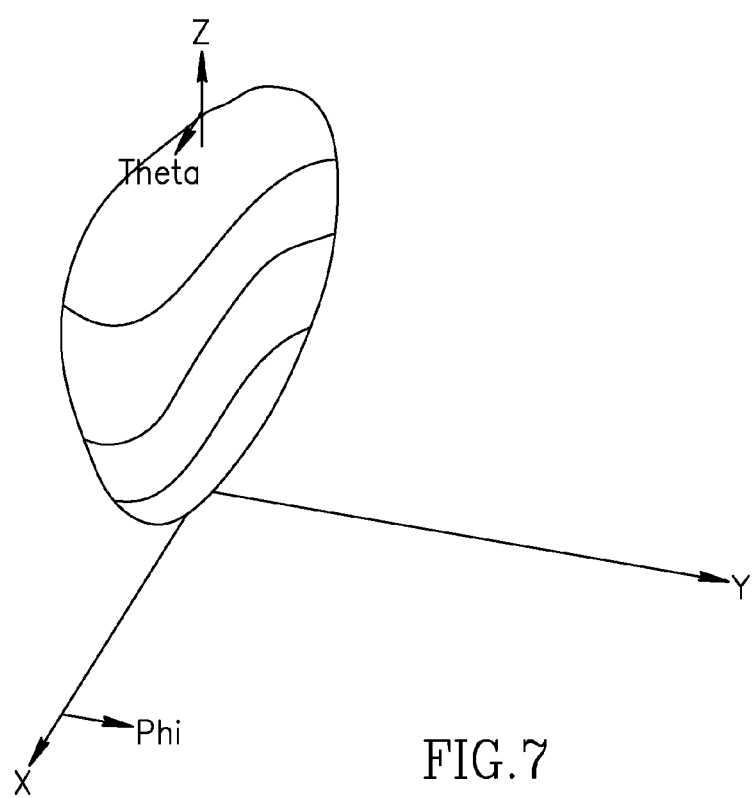
FIG. 7 is a diagram illustrating an example radiation pattern of the dual polarized dipole with reflectors in the Y direction.

In this embodiment, the two folded dipole elements are connected to a single resistive element. In this configuration, the current flows through the resister in any polarization, but will not flow through the perpendicular dipole structure. The radiation pattern of the dual polarized dipole with reflectors can be seen in FIG. 6 (X-direction polarization) and in FIG. 7 (Y-direction polarization).

Figure 8A:
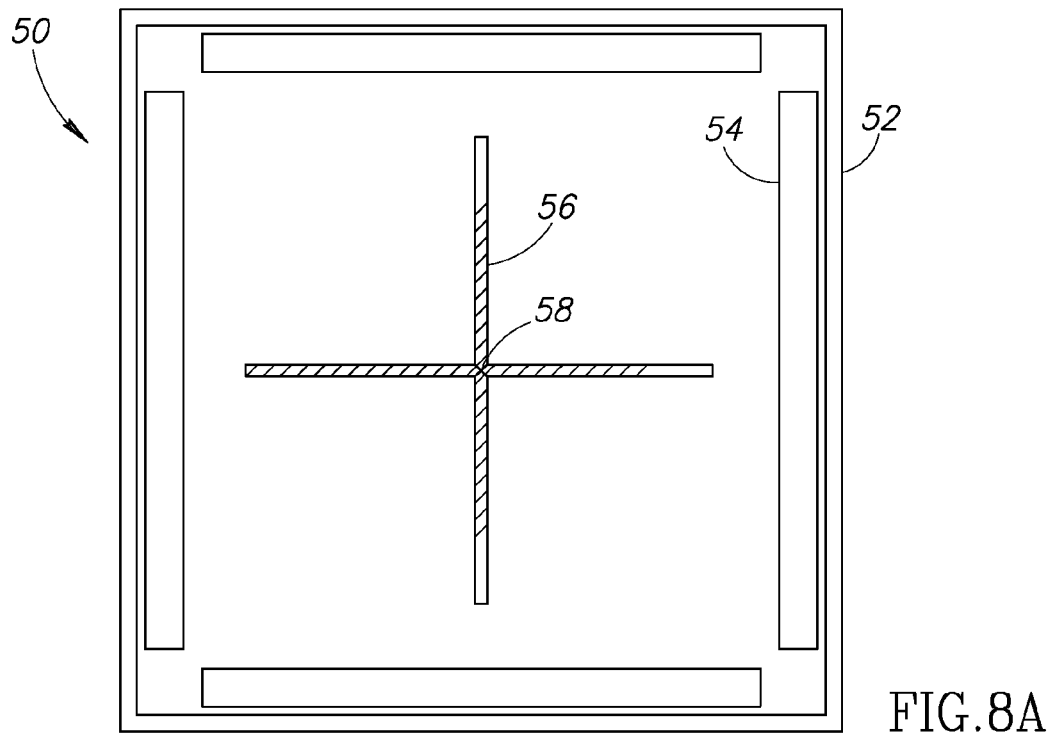
FIG. 8A is a diagram illustrating the surface current distribution at the dipole resonant frequency.
Figure 8B:
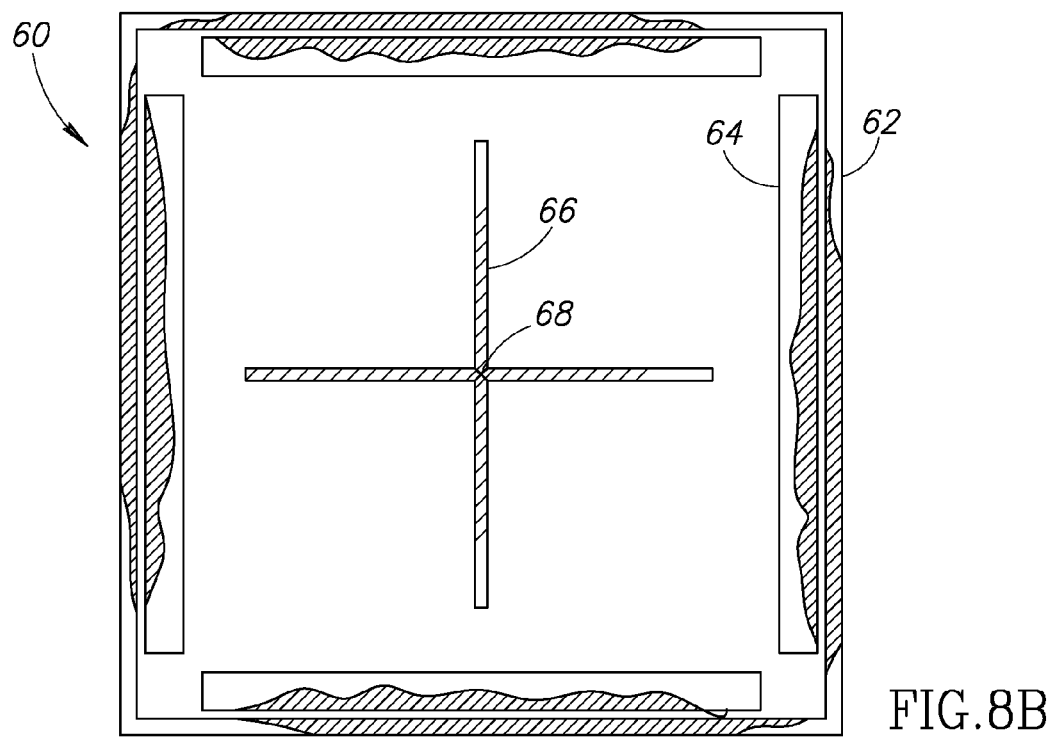
FIG. 8B is a diagram illustrating the surface current distribution at the reflectors resonant frequency.

Note that the antenna of FIG. 3 may exhibit narrow bandwidth, as is common for Yagi-Uda antennas. Depending on the implementation, the most critical problem appears at the resonant frequency of the reflectors, which is a bit lower than the resonant frequency of the dipole itself. At this frequency, the reflectors act as resonators with high effective area and therefore they deflect the electromagnetic field lines so that there is very little current flow in the dipole itself, i.e. very low absorption at this frequency. An example of such field distribution due to an incident plane wave in the Z direction can be seen in FIGS. 8A and 8B wherein the surface current distribution at the dipole resonant frequency is shown in FIG. 8A, and at the reflectors resonant frequency in FIG. 8B. In FIG. 8A, the detector, generally referenced 50, comprises a folded dipole 56, resister 58, reflectors 54 and readout circuit lines 52. In FIG. 8B, the detector, generally referenced 60, comprises a folded dipole 66, resister 68, reflectors 64 and readout circuit lines 62.

To overcome the reflectors resonance problem, it is desirable to shift the resonant frequency away from the bandwidth of interest. In one embodiment, shifting the resonant frequency is achieved by attaching the Yagi-Uda reflectors to the readout lines located around each pixel to form a closed RF current loop. Doing this relates the resonant frequency to the pixel perimeter length in an even mode at much lower frequency. On the other hand, the Yagi-Uda reflection action invokes the odd mode in the ring which is at a similar frequency, so this function is not harmed.

Figure 9:
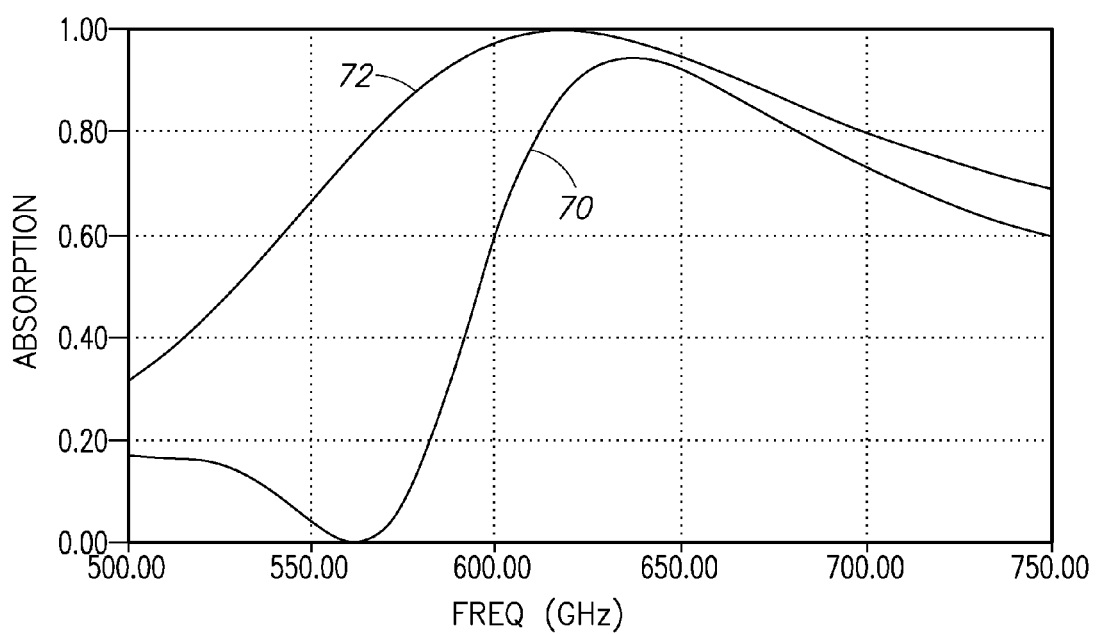
FIG. 9 is a diagram illustrating absorption results of the dipole with Yagi-Udi reflectors.

A diagram illustrating total absorption results of the dipole with Yagi-Udi reflectors is shown in FIG. 9. The total absorption is calculated as the part of the energy which is absorbed in the antenna and in the resistor, due to an incident plane wave excitation. Note that trace 70 represents the absorption results of the dipole with Yagi-Uda reflectors that do not contact the read out lines, while trace 72 represents the absorption results of the dipole with Yagi-Uda reflectors that contact the read out lines. A distinct difference appears at approximately 560 GHz which is the resonant frequency of the reflectors.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An antenna for receiving terahertz (THz) radiation, comprising:
   a suspended conductive dipole element supported by a non-conductive holding arm;

a load resistor directly coupled to said dipole element and operative to convert said received THz radiation to thermal energy; and a plurality of reflectors physically isolated from said dipole element.

2. The antenna according to claim 1, wherein said plurality of reflectors comprises a plane conductor located below said dipole element.

3. The antenna according to claim 2, wherein said plane conductor is located approximately one quarter wavelength below said dipole element.

4. The antenna according to claim 1, wherein said plurality of reflectors comprises first and second metallic reflectors substantially parallel to said dipole element and in the same plane thereof.

5. The antenna according to claim 4, wherein said first and second reflectors are adapted to function substantially as Yagi-Udi reflectors.

6. An antenna for receiving terahertz (THz) radiation, comprising:
 a pair of perpendicularly folded suspended conductive dipole elements supported by a non-conductive holding arm; and
 a plurality of reflectors physically isolated from said dipole elements.

7. The antenna according to claim 6, wherein said plurality of reflectors comprises a plane conductor located below said dipole elements.

8. The antenna according to claim 7, wherein said plane conductor is located approximately one quarter wavelength below said dipole elements.

9. The antenna according to claim 6, wherein said plurality of reflectors comprises two pairs of reflectors, each reflector pair comprising first and second reflectors substantially parallel to a dipole element and in the same plane thereof.

10. The antenna according to claim 9, wherein each said first and second reflectors are adapted to function substantially as Yagi-Udi reflectors.

11. A detector for detecting terahertz (THz) radiation, comprising:
 a suspended conductive dipole element supported by a non-conductive holding arm;
 a plurality of reflectors physically isolated from said dipole element;
 a load impedance directly coupled to said dipole element and operative to convert said received THz radiation to thermal energy; and
 a thermal sensor operative to generate an electrical signal in accordance with the heat generated by said load impedance.

12. The detector according to claim 11, wherein said plurality of reflectors comprises a plane conductor located below said dipole element.

13. The detector according to claim 12, wherein said plane conductor IS located approximately one quarter wavelength below said dipole element.

14. The detector according to claim 11, wherein said plurality of reflectors comprises first and second metallic reflectors substantially parallel to said dipole element and in the same plane thereof.

15. The detector according to claim 14, wherein said first and second reflectors are adapted to function substantially as Yagi-Udi reflectors.

16. The detector according to claim 14, further comprising a readout circuit situated around said detector.

17. The detector according to claim 14, further comprising a readout circuit situated around said detector and attached to said reflectors thereby forming a closed RF current loop.

18. A detector for detecting terahertz (THz) radiation, comprising:
 a pair of perpendicularly folded suspended conductive dipole elements supported by a non-conductive holding arm;
 a plurality of reflectors physically isolated from said dipole elements;
 a single load impedance directly coupled to said dipole elements and operative to convert said received THz radiation to thermal energy; and
 a thermal sensor operative to generate an electrical signal in accordance with the heat generated by said load impedance.

19. The detector according to claim 18, wherein said plurality of reflectors comprises a plane conductor located below said dipole elements.

20. The detector according to claim 19, wherein said plane conductor is located approximately one quarter wavelength below said dipole elements.

21. The detector according to claim 18, wherein said plurality of reflectors comprises two pairs of reflectors, each reflector pair comprising first and second reflectors substantially parallel to a dipole element and in the same plane thereof.

22. The detector according to claim 21, wherein each said first and second reflectors are adapted to function substantially as Yagi-Udi reflectors.

23. The detector according to claim 18, further comprising a readout circuit situated around said detector.

24. The detector according to claim 18, further comprising a readout circuit situated around said detector and attached to said reflectors thereby forming a closed RF current loop.

* * * * *